May 20, 1958  J. H. GATES ET AL  2,835,777

HEATED STEERING WHEEL

Filed June 28, 1956

INVENTORS
John H. Gates
Vernon B. Burden
BY
Their Attorney

United States Patent Office 2,835,777
Patented May 20, 1958

2,835,777

HEATED STEERING WHEEL

John H. Gates, Dayton, and Vernon B. Burden, Clayton, Ohio, assignors to General Motors Corporation, Detroit, Mich., a corporation of Delaware Application June 28, 1956, Serial No. 594,611

7 Claims. (Cl. 219—19)

This invention relates to steering wheels and more particularly in an improved electrically heated steering wheel.

Heretofore various electrically heated steering wheels have been proposed which consist essentially of heating elements in the form of rods, wires or bulbs contained within hollow portions of the steering wheel rim and spokes or otherwise imbedded within portions of the steering wheel. Such proposals usually involved more or less complicated heating element arrangements and a steering wheel design especially adapted to contain the heating apparatus.

Ideally in use the surface of a steering wheel is heated instantaneously to a temperature which feels warm to the hand and is maintained at that temperature. The above mentioned heating element arrangements of the prior art involve a relatively small thermal mass imbedded relatively deep within the wheel rim and spokes. As a consequence a considerable temperature differential is necessary between the temperature of the heating elements and the surface of the wheel to heat the wheel surface adequately in a reasonably short time. This temperature differential involves relatively high heating element temperatures which tend to be destructive to the rubber portions of the steering wheel and require a means for regulating the temperature of the heating elements after the wheel surface has reached a desired temperature. Moreover such heating arrangements usually fail to provide uniform heating of the steering wheel and involve considerable power consumption.

It is an object of this invention to provide an electrically heated steering wheel of simple and economical construction having a heating element which may be associated with conventionally used hard rubber steering wheels and which provides an almost instantaneous uniform heating thereof at a minimum power consumption.

It is a further object of this invention to provide an electrically heated steering wheel having a heating element in the form of a thin metallic film incorporated in the surface of a hard rubber type steering wheel.

Further objects and advantages of the present invention will be apparent from the following description, reference being had to the accompanying drawings wherein a preferred embodiment of the present invention is clearly shown.

Figure 1:
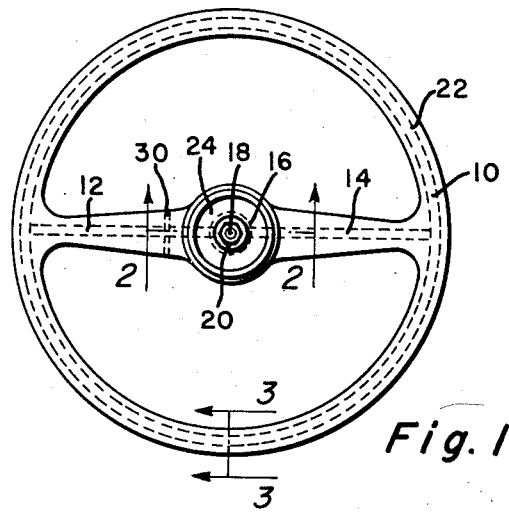
Figure 1 is a front elevation of a hard rubber steering wheel.
Figure 2:
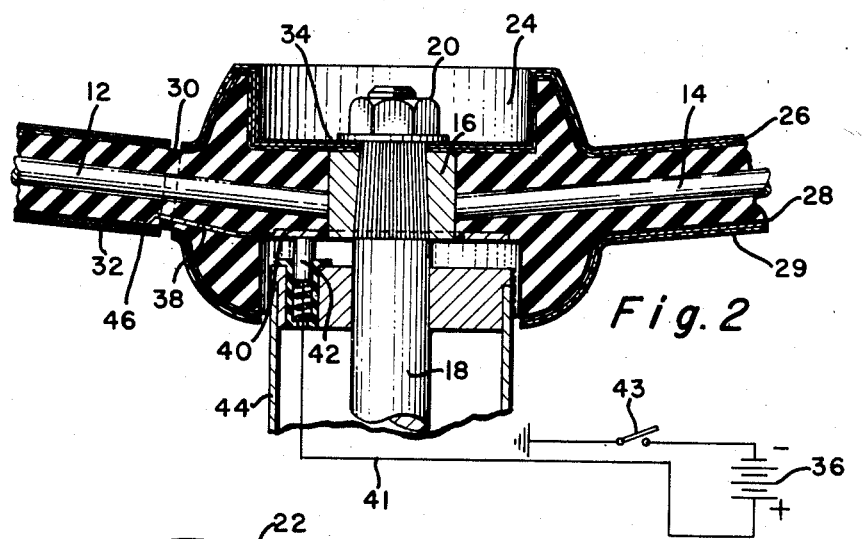
Figure 2 is an enlarged cross-sectional view taken along lines 2—2 of Figure 1.
Figure 3:
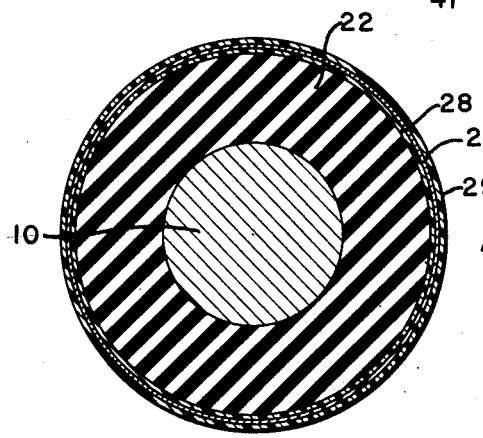
Figure 3 is an enlarged cross-sectional view taken along lines 3—3 of Figure 1.

Referring now to the drawings, the present invention will be described in connection with a more or less conventional two-spoke steering wheel as shown in Figure 1 which includes a metal skeleton or framework having a rim 10, spokes 12 and 14 and a hub 16 secured to a steering shaft 18 by means of nut 20. About the spokes 12 and 14, the rim 10 and the hub 16 is molded a hard rubber body portion 22 which covers these members and provides a cavity 24 therein adapted to receive a horn button or the like (not shown). The present invention is applicable to any steering wheel having outer portions made of suitable relatively rigid insulating material such as hard rubber and various synthetic resins as is well known in the art. The hard rubber steering wheels generally in use are entirely suitable for the present purpose. A suitable formulation may include about 78 parts 6RS (a butadiene-styrene copolymer) 64 parts ground rubber scrap, 18 parts hard carbon black, 21 parts hydrocarbon oil, 200 parts ground limestone, 12 parts mineral bitumen, 4 parts organic accelerator, 7.5 parts hydrated calcium oxide, 4.5 parts zinc oxide and 22 parts sulfur.

In accordance with the present invention the entire steering wheel is coated with an extremely thin layer or film of metal 26 in the neighborhood of 3 to 12 millionths of an inch and preferably from 5 to 10 millionths of an inch. A suitable metal for this purpose is aluminum which may be conveniently applied by vacuum deposition. Prior to the deposition of the aluminum film, the rubber portions of the steering wheel, after the molding and curing thereof, are preferably coated with a layer of suitable sealer or paint 28 whereby the pores of the rubber are sealed and a smooth imprevious surface is provided for the deposition of the aluminum film.

In the process of applying the metal film by vapor deposition, the steering wheel having a coating of suitable sealer material or paint thereon is placed in a vacuum chamber containing a tungsten grid heating element and being evacuated to at least 0.002 mm. of Hg. Pieces of aluminum metal placed on the tungsten grid are vaporized by heating the aluminum to its boiling point. The vaporized aluminum is then uniformly condensed over the steering wheel.

The metal film is then broken about the entire circumference of one of the spokes, preferably in close proximity to the hub, as shown at 30. It may be seen that the metal film forms an electrical high resistance conductor or heating element having terminals represented by the spoke metal film portion 32 and the hub metal film portion 34, which may be connected directly to a battery 36 having one terminal thereof grounded. To this end the hub metal film portion 34 of the metal film 26, which is in electrical contact with the hub portions 34 of the wheel, is connected to the grounded negative battery terminal through the shaft 18. The opposite terminal or metal film portion 32 is connected to the positive battery terminal by any suitable means which makes allowance for an electrical contact between relatively movable members. The connection is preferably accomplished by means of a relatively flat metal finger 38 imbedded in the rubber of the spoke and hub and electrically connected to an annular disk 40 partially imbedded in the base of the rubber portions of the hub and insulated from the metal hub portions 18. The annular disk 40 is in direct electrical contact with the battery by means of a lead 41 connected to a spring biased plunger 42 which is retained on the steering wheel column 44 and insulated therefrom, and which maintains constant electrical contact with the disk 40 as the steering wheel is rotated. Preferably the described circuit includes a switch 43 which may be mounted at any convenient location, as for example, the dashboard or the steering wheel post. One of the advantages of the present invention is that the electrical resistance of the metal film within the ranges set forth above is such that a desirable degree of heating of the steering wheel surfaces is obtained without the use of other resistance elements, rheostats and the like in the heating circuit with a 6 or 12 volt battery conventionally used in automobiles.

The metal finger 38 is preferably formed with an end flat portion 46 imbedded in the rubber so as to have a surface thereof flush with the surface of the rubber whereby the metal film is deposited continuously over the flat portion 46 and the surrounding rubber, thereby making a suitable electrical contact. The finger 38 recedes into the rubber portions of the spoke and extends into electrical contact with the disk 40, so as to be insulated from the metal film 26 except at the spoke 32 terminal portion.

The steering wheel is preferably finally coated with a suitably decorative paint layer 29 which covers the metal layer. The paint layer may be any of the paints conventionally used in painting steering wheels or it may be a clear paint whereby the colorful character of a metal layer such as aluminum may be utilized for decorative purposes.

Suitable paints for both the sealer coating and the final coating include the conventionally used modified alkyd resin baking enamels for painting steering wheels. These include for example a glyptal resin modified by resins such as urea, melamine and phenol formaldehyde and carried by a drying oil vehicle such as linseed and cottonseed oil.

Although the outer paint layer 29 is not essential, its use is desirable to protect the metal layer from the wear to which the surface of the steering wheel is normally exposed.

Although the metal layer 26 is preferably applied by means of the above described vapor deposition process, it may also be applied by other means as for example in the form of a coating of silver paint and by electrodeposition methods. The vapor deposition method above referred to is preferred because of its relative simplicity, because it is capable of providing a highly desired metal layer of uniform thickness and because it is readily amendable to forming a metal layer of a desired thickness.

The exact thickness of the metal film 26 will depend on the degree of heating desired, the size of the steering wheel, the number of spokes in the steering wheel and the size of the battery used. The optimum thickness of the film for a given installation may be readily determined by simple experimentation and will vary between the ranges set forth above which may be readily applied by the above described vapor deposition process.

The heating arrangement of the present invention has a number of advantages over heating arrangements of the prior art. The heating arrangement may be readily associated with the type of steering wheels presently in use so that in the manufacture thereof the same basic steering wheel design conventionally used for unheated wheels may be used to produce heated wheels with obvious economic advantages. Further since the heating element is incorporated in the wheel at the surface thereof and extends over the entire surface, a uniform heating is obtained. Moreover the temperature differential between the heating element and surface of the wheel may be zero or a very small amount whereby the heating element may be operated at a relatively low temperature and preferably at a temperature which feels warm to the hand and the heating effect is almost instantaneous. As a consequence operating the heating element at temperature which may be destructive to the rubber or insulating material of the wheel is avoided and a high degree of efficiency is obtained. It has been found that a 1956 Chevrolet two spoke steering wheel having a diameter of about 18" and an average rim diameter of about 1" and having a metal insert covered with a hard rubber composition of the type disclosed above or Tenite II, a cellulose Acetate Butyrate Composition, may be adequately heated with respect to surrounding temperatures ranging from 10 to 35° F. with a metal film thickness of from 5 to 10 millionths of an inch with a power consumption of from 5 to 15 watts. Another advantage of the present invention is that with a metal film of suitable thickness no apparatus is required to regulate the current flow into the heating element and it may be connected directly to the battery.

While the embodiments of the present invention as herein disclosed constitute preferred forms, it is to be understood that other forms might be adopted.

What is claimed is as follows:

1. An electrically heated steering wheel comprising a wheel member having a rim, a hub-like support member and spokes therebetween, the outer surface portions of said wheel member being formed of a relatively rigid insulating material, a metal film disposed over at least the rim and the spokes of said wheel member, the continuity of said film on at least one of the spokes being broken to form a heating element, a source of electrical energy for heating said heating element, and means for connecting said source to said heating element.

2. An electrically heated steering wheel comprising a wheel member having a rim, a hub-like support member and at least two spoke members extending therebetween, said hub-like support member including an electrically grounded metal portion, the outer surfaces of said rim and spokes being formed of a relatively rigid insulating material, a metal film disposed over said wheel member in electrical contact with said metal portion, the continuity of said metal film being broken about the entire circumference of one of said spokes, a source of electrical energy, said source being connected to ground and the metal film of said spoke outwardly of the broken portion of said film.

3. An electrically heated steering wheel comprising a hard rubber wheel member having a rim, a hub-like support member and at least two spoke members extending therebetween, said hub-like support member including a portion adapted to be electrically grounded, a metal film disposed over said wheel member in electrical contact with said metal portion, the continuity of said metal film being broken about the entire circumference of one of said spokes, and means adapted to connect the metal film portion of said spoke, outwardly of said broken portion, to a source of electrical energy.

4. An electrically heated steering wheel comprising a metal reinforced hard rubber wheel member having a rim, a hub-like support and at least two spoke members extending therebetween, said hub-like member including a metal portion adapted to be grounded, a continuous metal film from 3 to 12 millionths of an inch in thickness deposited over said wheel member and at least a portion of said metal portion, the continuity of said metal film being broken about the entire circumference of one of said spokes, and means adapted to connect the metal film portion of said spoke outwardly of said broken portion to a source of electrical energy.

5. An electrically heated steering wheel comprising a metal reinforced hard rubber wheel member having a rim, a hub-like support and at least two spoke members extending therebetween, said hub-like member including a metal portion adapted to be grounded, a continuous aluminum vapor deposited film from 3 to 12 millionths of an inch in thickness deposited over said wheel member and at least a portion of said metal hub portion, the continuity of said metal film being broken about the entire circumference of one of said spokes, a film of electrically insulating paint covering said metal film, and means for connecting the metal film portion of said spoke outwardly of said broken portion to a source of electrical energy.

6. In a steering wheel of the hard rubber type having a rim, a hub-like portion and at least two spokes therebetween, which has been coated with an electrically insulating paint and includes a metal hub portion adapted to be electrically grounded, a heating element in the form of an aluminum film from 3 to 12 millionths of an inch in thickness interposed between said paint coating and the rubber of said wheel, said heating element being coextensive with said rim and spokes and being in electrical contact with said metal hub portion, said heating element having a portion broken about the entire circumference of one of said spokes, and means for electrically connecting said metal film outwardly of said broken portion to a source of electrical energy.

7. In a steering wheel formed of relatively rigid electrically insulating material, having a rim, a hub-like portion and at least two spokes therebetween, which has been coated with an electrically insulating paint and includes a metal hub portion, and a heating element in the form of a metal film from 3 to 12 millionths of an inch in thickness interposed between said paint coating and the said insulating material, said heating element being coextensive with said rim and spokes and being in electrical contact with said metal hub portion, said heating element having a portion broken about the entire circumference of one of said spokes, said metal hub portion and said metal film outwardly of said broken portion being adapted for connection to a source of electrical energy.

References Cited in the file of this patent
UNITED STATES PATENTS

| | | |
|---|---|---|
| 1,581,884 | Stewart et al. | Apr. 20, 1926 |
| 1,978,089 | Jones | Oct. 23, 1934 |
| 2,205,543 | Rideau et al. | June 25, 1940 |
| 2,392,539 | Leible | Jan. 8, 1946 |